(12) United States Patent
Voss

(10) Patent No.: US 8,718,462 B2
(45) Date of Patent: May 6, 2014

(54) CONTROL UNIT

(71) Applicant: Arnold & Richter Cine Technik GmbH & Co. Betriebs KG, Munich (DE)

(72) Inventor: Hendrik Voss, München (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 0 days.

(21) Appl. No.: 13/693,284

(22) Filed: Dec. 4, 2012

(65) Prior Publication Data

US 2013/0182137 A1    Jul. 18, 2013

(30) Foreign Application Priority Data

Dec. 13, 2011    (DE) .......................... 10 2011 121 021

(51) Int. Cl.
*G03B 17/18* (2006.01)
*H04N 5/232* (2006.01)

(52) U.S. Cl.
USPC .......... 396/287; 396/292; 396/56; 348/211.1; 348/211.2; 348/211.4; 348/211.9; 348/333.02

(58) Field of Classification Search
USPC ...................... 396/287, 281, 290, 292, 56, 57; 348/211.99, 211.1, 211.4, 211.9, 348/333.02
See application file for complete search history.

(56) References Cited

U.S. PATENT DOCUMENTS

| 6,161,933 | A | 12/2000 | Tschida et al. |
| 6,215,480 | B1 | 4/2001 | Danis et al. |
| 6,819,867 | B2 | 11/2004 | Mayer, Jr. et al. |
| 8,253,920 | B2 | 8/2012 | Bauer et al. |
| 2003/0025802 | A1* | 2/2003 | Mayer, Jr. et al. ....... 348/211.99 |
| 2005/0140816 | A1 | 6/2005 | Tschida et al. |
| 2008/0225234 | A1 | 9/2008 | Bauer et al. |

FOREIGN PATENT DOCUMENTS

| DE | 17 75 594 A1 | 8/1971 |
| DE | 4219331 A1 | 12/1993 |
| DE | 196 29 484 A1 | 1/1998 |
| DE | 202 16 844 U1 | 2/2003 |
| DE | 10 2004 015 947 A1 | 10/2005 |
| DE | 10 2006 031 626 B3 | 1/2008 |
| DE | 10 2007 008 897 A1 | 8/2008 |
| DE | 10 2008 052 472 A1 | 4/2010 |
| WO | 2010/046237 A1 | 4/2010 |

OTHER PUBLICATIONS

Translation of German Search Report dated Aug. 2, 2012 relating to German Patent No. 10 2011 121 021.4.

* cited by examiner

*Primary Examiner* — Rochelle-Ann J Blackman
(74) *Attorney, Agent, or Firm* — Gifford, Krass, Sprinkle, Anderson & Citkowski, P.C.

(57) ABSTRACT

A control unit for generating a control signal comprises a base part, a control element rotatable about an axis of rotation relative to the base part, a position encoder for detecting an angular position or a change in angular position of the control element relative to the base part, a control device which is adapted generate the control signal in dependence on the detected angular position or change in angular position of the control element and an electronic display device, wherein the control device is adapted to control the electronic display device to show at least one symbol arrangement. The control unit is characterized in that the electronic display device has the shape of a cylinder or of a cylinder sector whose axis coincides with the axis of rotation of the control element or extends in parallel thereto.

19 Claims, 4 Drawing Sheets

CONTROL UNIT

Figure 1:
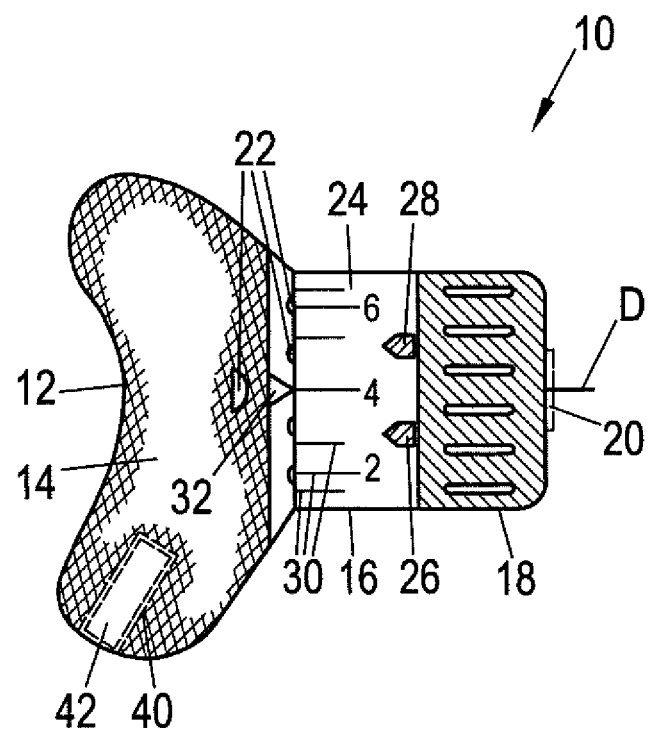

The present invention relates to a control unit for generating a control signal comprising a base part, a control element rotatable about an axis of rotation relative to the base part, a position encoder for detecting an angular position or a change in angular position of the control element relative to the base part, a control device which is adapted generate the control signal in dependence on the detected angular position or change in angular position of the control element and an electronic display device, wherein the control device is adapted to control the electronic display device to show at least one symbol arrangement.

Such control units make it possible to associate specific symbols (e.g. numbers, letters and/or scales) to the control element, with the specific selection of the symbols being able to take place in dependence on a respective control situation or user-controlled. A function corresponding to a specific system can be selected or activated with the aid of the control element or a setting value can, for example, be selected from a setting value range represented by means of a scale. A corresponding control signal is transmitted, for example, to a functional unit associated with the control unit.

Such control units are used in all areas of the art, for example in motor vehicles, in aeronautics, in shipping and for the operation or control of machines or electrical or electronic devices. An advantageous application is in particular in the movie industry.

For example with conventional motion picture cameras (film cameras) or electronic motion picture cameras, a setting of the focus (image sharpness) can be carried out by rotating an objective ring at the objective of the motion picture camera. The focus setting frequently takes place, however, with the aid of a focus setting apparatus provided at the motion picture camera which is controlled via a control unit, also called a follow-focus, operated by a camera assistant. The focus setting apparatus has a motor unit which is configured to turn the objective ring and to effect a focus setting in this manner. The control unit with the actual control element can be arranged in an operator-friendly position at the motion picture camera itself or can be designed as a remote control unit which is configured for a wired or wireless communication with the motion picture camera.

The focus setting apparatus has means to receive corresponding control signals from the control unit and to convert them into corresponding control commands to the motor unit. Optionally, a bidirectional communication can be provided between the focus setting apparatus and the control unit so that data such as the currently set focus value can also be transmitted from the focus setting apparatus to the control unit.

A control unit of this category is disclosed, for example, in WO 2010/046237 A1. The control unit described there and also configured as a remote control unit has a rectangular flat screen integrated into a housing as a display device for displaying a focus scale and further parameters as well as a hand wheel arranged laterally at the housing for setting the focus. Such a control unit offers the camera assistant an expedient user interface and the advantages of a more comfortable control position with respect to an adjustment at the objective ring, a finer translation of the control movement in the focus adjustment, the display of additional information such as the respective depth of field, as well as the possibility of marking specific distance settings which coincide, for example, with measured spacings in the motif. The operation of such a control unit is, however, not always intuitive due to the spatial and logical separation of the hand wheel from the display device.

It is therefore the object of the invention to provide a control unit having a flexible use possibility and easy operability.

It is satisfied in that the electronic display device has the shape of a cylinder or of a cylinder sector whose axis coincides with the axis of rotation of the control element or extends in parallel thereto.

The display device accordingly has a curvature, with the symbol arrangement extending in the peripheral direction over the display device. Since the rotatable control element typically has a cylindrical shape, the curvature of the display device can correspond to the likewise curved section of the rotatable control element facing the user. The display device can, for example, peripherally surround a part of the rotatable control element as a jacket surface of a cylinder (i.e. as a hollow cylinder). It is, however, sufficient if the display device only corresponds to a cylinder sector, i.e. is bounded in the peripheral direction. In both cases, the axis of the cylindrical shape of the electronic display device preferably extends coaxially to the axis of rotation of the control element. Alternatively, the two axes can, however, also be offset from one another.

The symbol arrangement shown at the electronic display device is located in spatial proximity to the control element so that an intuitive and nevertheless flexile association of individual symbols of the symbol arrangement with the rotatable control element is present. In comparison with a fixedly printed on or impressed symbol arrangement or scale, a plurality of possibilities result due to the electronic display device to increase the operational comfort even further for the user, which will be explained in more detail in the following with reference to preferred embodiments.

In accordance with a preferred embodiment of the invention, the electronic display device is not lit, with the electronic display device preferably being an electronic paper. Such non-lit or passive display devices are characterized by a small power consumption and a good readability, largely independent of the angle of view, both under normal room light and in bright sunshine. The electronic paper can, for example, be a display device based on the principle of electrophoresis. Such an electronic paper is also known under the name "E-ink" and includes microcapsules which e.g. include positively charged white particles and negatively charged black particles in a transparent viscous polymer. The representation is varied by a brief application of an electrical voltage and then remains stable for a longer period of time without a voltage having constantly to be applied or a current having constantly to flow. Electronic papers allows the manufacture of curved display devices in a particularly simple manner.

A read-off mark associated with the electronic display device is preferably provided in the base part, with the relative position of the symbol arrangement shown at the electronic display device defining a setting value with respect to the read-off mark and with the named control signal including the setting value. That setting value is thus transmitted to a receiver which corresponds to the symbol coinciding with the read-off mark. Alternatively, the read-off mark can also be shown electronically or as a printed mark on the electronic display device.

The control unit can furthermore include an input device (e.g. button) by means of which the user can transmit a selection command to the control device. The control device can in particular show an additional symbol (e.g. mark) at the display device or can generate and output the named control signal in response to such a selection command.

The control signal preferably includes at least one focus control signal for controlling a focus adjustment apparatus of a motion picture camera, with the control device being adapted to transmit the focus control signal to the focus setting apparatus, and with the symbol arrangement including a focus scale. The focus scale shown on the display device is thus similar to the focus scale usually printed on the objective ring. Since the axis of rotation of the preferably likewise cylindrical control element coincides with the axis of the cylindrical display device or at least extends in parallel hereto, a particularly intuitive operation results which is based on the operation of an objective ring provided directly at the camera objective.

Various other applications are generally also possible in a motion picture camera. Alternatively or additionally, for example, an aperture control signal or a focal length control signal for controlling an aperture setting apparatus or a focal length setting apparatus (zoom apparatus) respectively of a motion picture camera with the aid of the named control element or of a respective additional control element associated with a further display device can also be produced, with the symbol arrangement then including a corresponding aperture value scale or focal length scale.

Furthermore, applications are also conceivable in the field of automotive engineering, in aeronautics or in shipping.

The focus scale preferably includes a plurality of distance values and at least one focus value mark freely selectable by a user. The distance values can in this respect be represented in the form of scale lines with and without lettering. The focus value marks which can be represented by arrow symbols, for example, allow the user to set one or more focus values in a simple manner, for example by measuring the motif, with the aid of the control element. A plurality of (e.g. graphically different) focus value marks can preferably be included in the focus scale.

In accordance with an advantageous embodiment, the focus scale shown at the electronic display device has a range of a plurality of distance values which is adjustable by a user. The adjustable range can include the total setting range of the associated camera objective. Alternatively, the adjustable range can, however, also only include one or more part ranges of the distance value range of the objective. If, for example, the measured distances to be focused in a motif only lie within a very small range, the focus scale shown on the electronic display device can be spread apart to approximately this depth range so that a particularly sensitive setting of the focus value is possible.

In accordance with a further preferred embodiment of the invention, the electronic display device is also rotatable relative to the base part, with the electronic display device preferably being rotationally fixedly coupled to the rotatable control element. In this respect, the symbol arrangement or the focus scale and in particular also the focus value marks rotate in common with the control element. The rotational speeds of the display device or of the control element can be the same or different, with the latter being able to be realized e.g. by a transmission which is operative between the display device and the control element so that a rotationally active coupling is present instead of a rotationally fixed coupling.

Alternatively, the electronic display device is rotationally fixedly coupled to the base part, with the control device being adapted to vary an angular position of the shown symbol arrangement relative to the electronic display device in dependence on the detected angular position or on the change in angular position of the control element. In other words, the control device is adapted to control the electronic display device to show the symbol arrangement such that the shown symbol arrangement follows a rotation of the control element relative to the base part (at the same or at a different rotational speed). The display device is accordingly stationary with respect to the base part so that the symbol arrangement (e.g. focus scale and focus value marks) rotates purely virtually on a rotation of the control element, that is its representation or relative position on the display device is displaced in the peripheral direction.

In the two aforesaid embodiments, it is achieved that a rotation of the control element relative to the base part effects a rotation of the symbol arrangement (e.g. focus scale and focus value marks) relative to the base part.

In accordance with a further preferred embodiment, the control device is adapted to define the measure of change of the angular position of the shown symbol arrangement as a product from the detected change in angular position of the control element and from a scaling factor, with the scaling factor preferably being freely settable by a user. An "electronic transmission" can so-to-say hereby be realized whose transmission factor can preferably be changed by the user. If the scaling factor is equal to 1, the control element and the symbol arrangement (e.g. focus scale) move synchronously with one another. It is, however, also possible by the selection of a factor different from 1 so-to-say to establish a step-up or a step-down between the movement of the focus scale and of the control element. On the one hand, small change in angular positions of the control element can thereby be converted into large angular changes of the symbol arrangement or focus scale and thus into large change rates of the setting value or desired focus value to be able to carry out fast focal changes over a large range, for instance, and, on the other hand, large change in angular positions of the control element can be converted into small angular changes in order, for instance, to allow a particularly sensitive setting of the focus.

The control device is preferably adapted to store and access user-defined settings of the symbol arrangement. These settings can, for example, include the positions of previously defined focus value marks, the distance value range to be shown on the focus scale or the above-explained scaling factor. For this purpose, the control device can have a non-volatile memory. The user can thus prepare and store a plurality of data sets which can be accessed again at a later time as required and thus do not have to generated again.

In accordance with a further advantageous embodiment, the base part includes a grip part which has a receiver for at least one energy store (e.g. a battery) for supplying the control unit with electrical power. The user grips the control unit at the grip part at least during operation and thus also indirectly grasps the energy store. Due to the body heat of the user, the energy store is thereby heated, which in particular increases the performance capability of the energy store at low outside temperatures.

The base part preferably has a lighting device for illuminating at least one part region of the electronic display device with incident light. The illumination of the display device allows a use of the control unit even in the dark. Interference of the environment can be avoided with a restriction of the lighting to a part region of the electronic display device facing the user. In particular in the explained application for a motion picture camera, an impairment of the scene by glare or interfering light can be avoided in a usual situation of use in which the user of the control unit faces the scene to be taken and the display device faces the user and is thus remote from the scene.

In accordance with a further advantageous embodiment of the invention, the control device is selectively switchable into a focus control mode or into a configuration mode, with the control device being adapted to control the electronic display device in the focus control mode for showing the symbol arrangement (e.g. focus scale), to detect the angular position or angular positional change of the control element and to transmit the control signal (e.g. focus control signal) to the associated functional unit (e.g. focus setting apparatus), and with the control device being adapted to control the electronic display device in the configuration mode for showing a configuration menu which allows the setting of operating parameters of the control unit. The representation of the configuration menu and of the symbol arrangement (e.g. focus scale) can take place in the same region of the electronic display apparatus. It is thus not necessary to provide a particularly large-area display device which unnecessarily confuses the user by presenting a large amount of information.

In an application for a motion picture camera, the control unit preferably has a (or the already named) input device for inputting a selection command to the control device, with the control device being adapted to set a focus value mark which can be shown on the focus scale in dependence on the indicated selection command. The currently set focus value can thus be taken over as a focus value mark, for example. It is not absolutely necessary to activate the named configuration mode to set the focus value marking.

A selectively deactivatable detent can preferably be provided between the base part and the rotatable control element. Provision can, for example, be made to activate the detent in the configuration mode for a precise control of the configuration menu and to deactivate it for a focus setting which is as sensitive as possible in the focus control mode.

In accordance with a further advantageous embodiment, the control element is additionally adjustable between at least two axial positions, with the control unit having a further position encoder for detecting the axial position of the control element. For example, the named detent can be activated or deactivated by an axial adjustment of the control element, with the detent preferably also including a detent of the axial position. Alternatively or additionally, the adjustment between the axial positions can also include a touch function so that, for example, a pressure in the axial direction onto the control element causes the setting of a focus value mark or the activation of a menu item depending on the selected mode of the control device. In this case, the axially adjustable control element satisfies the function of the above-named input device. Alternatively, the input device can also be realized by a button provided at the end face of the control element.

The control unit can preferably have at least one adjustable or fixed abutment which bounds the angular position range of the control element.

Further advantageous embodiments of the invention are set forth in the dependent claims, in the description and in the drawings.

Figure 2:
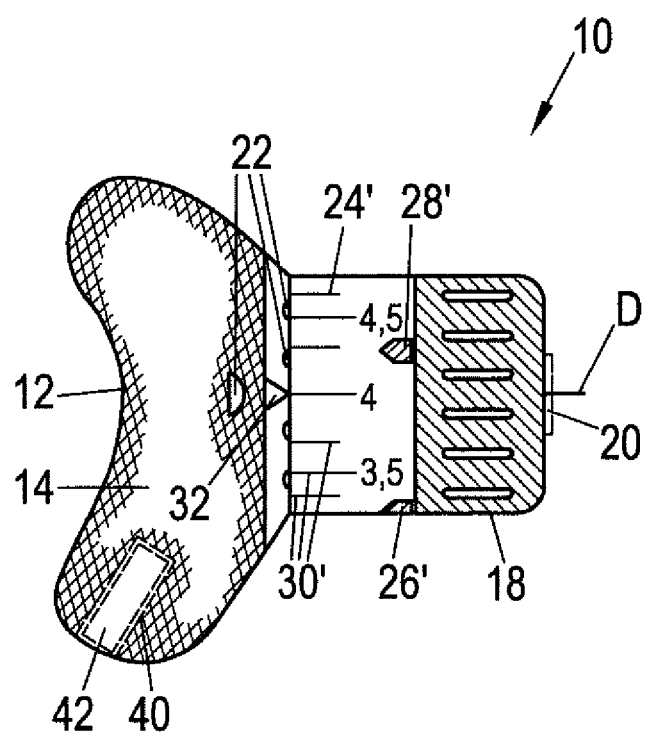
Figure 3:
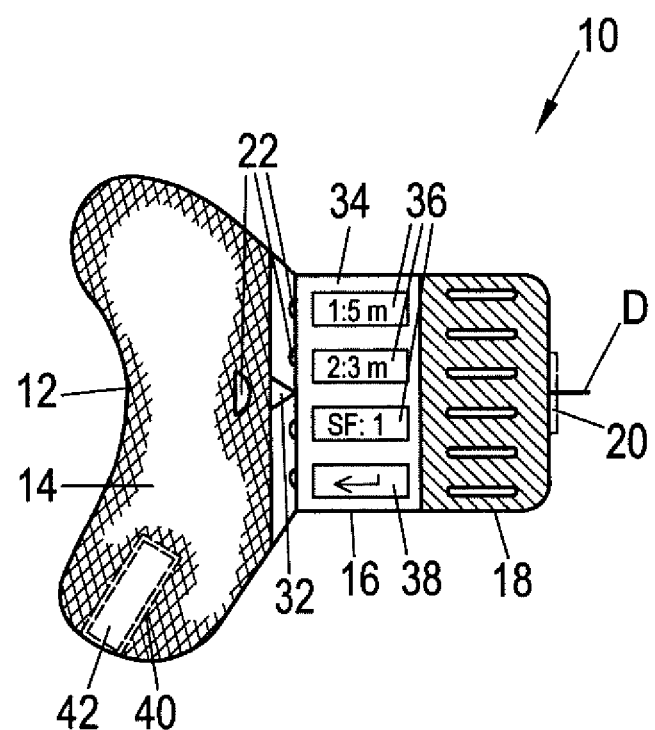
Figure 4:
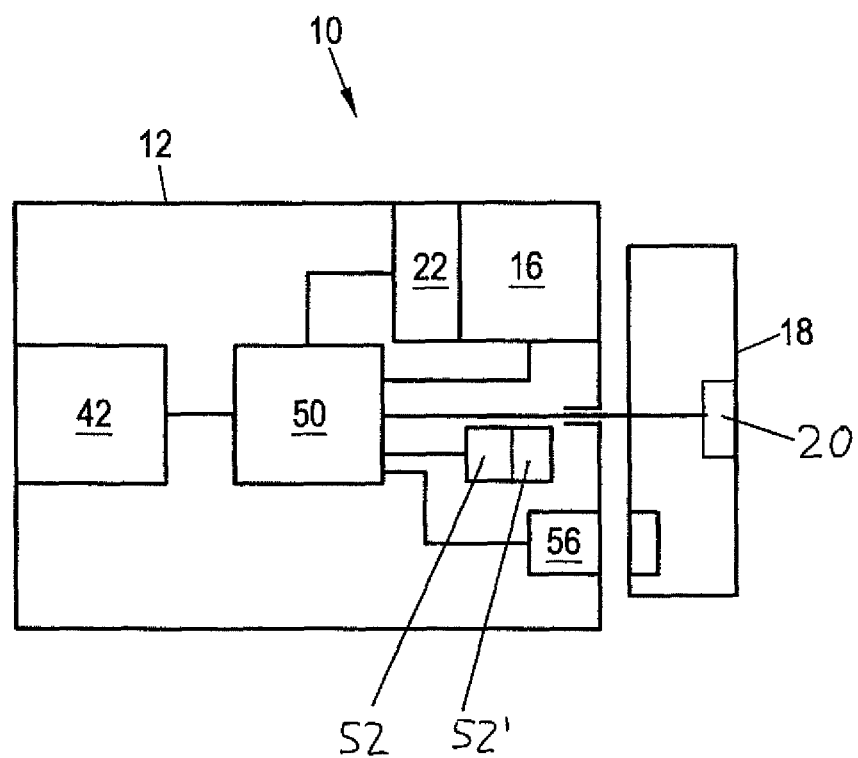

The invention will be explained in the following with reference to an embodiment and to the drawings. There are shown:

FIGS. 1 to 3 views of a control unit in accordance with the invention in different operating modes; and FIG. 4 a block diagram of the control unit shown in FIGS. 1 to 3.

A control unit in accordance with the invention configured as a remote control unit 10 includes, in accordance with FIGS. 1 to 3, a base part 12 which has an ergonomically shaped grip part 14. A cylindrical, passive electronic display device 16 is arranged laterally at the base part 12 and is directly adjacent to the base part 12. A likewise cylindrical control element 18 is arranged opposite the base part 12 and adjacent to the display device 16 and its jacket surface can be structured to improve the operating comfort. The base part 12 or the control element 18 can project into the (preferably hollow cylindrical) electronic display device 16.

The control element 18 is rotatable about an axis of rotation D relative to the base part 12. The axis of the cylindrical display device 16 coincides with the axis of rotation D. The jacket surface of the control element 18 (i.e. the peripheral outside of the control element 18) and the jacket surface of the electronic display device 16, for example adjoin one another in a flush manner, as is shown in FIGS. 1 to 3. A button 20, shown dashed, can be provided as an input device at an end face of the control element 18.

In the present embodiment, the display device 16 is rotationally fixedly arranged at the base part 12. In accordance with a modification, the display device 16 can instead also be rotationally fixedly coupled to the control element 18 so that the display device 16 and the control element 18 can rotate together relative to the base part 12.

The display device 16 can, as in the embodiment shown, have the shape of a cylinder and can extend at least approximately over an angular range of 360°. Alternatively, the display device 16 can also have the shape of a cylinder sector and can extend, for example over an angular range of only 180° or also only 120°.

A battery compartment 40 accessible from the outside and shown dashed is provided in the interior of the grip part 14 as a receiver for a battery 42 serving as an energy store.

The remote control unit 10 additionally has a control device (not shown) which is provided in the region of the base part 12 and which is configured for wireless communication with a focus setting apparatus of a motion picture camera (not shown). For this purpose, the control device is connected to a radio transmission device or to a radio transceiver device. The control device is furthermore connected to a position encoder 52 (FIG. 4) for detecting an angular position or a change in angular position of the control element 18 relative to the base part 12, to the electronic display device 16 and optionally to the button 20.

The control device is configured to transmit a focus control signal to the focus setting apparatus in dependence on the detected angular position or change in angular position of the control element 18. The control device is furthermore configured to control the electronic display device 16 in a respective focus control mode for showing a focus scale 24, 24' (FIGS. 1 and 2) or in a configuration mode for showing a configuration menu 34 (FIG. 3).

The focus scale 24, 24' includes different distance values 30, 30' which are shown in the form of differently long scale lines with and without lettering. The distance values 30, 30' are arranged on the side of the display device 16 facing the base part 12 (FIGS. 1 and 2).

The focus scale 24, 24' furthermore includes two respective focus value marks 26, 28 and 26', 28' respectively. The focus value marks 26, 26', 28, 28' are shown on the side of the display device 16 facing the control element 18, but can also be provided at any desired other point, in particular also at the side of the display device 16 facing the base part 12. They serve as memory aids and make it possible for the user to adjust the focus setting fast and directly between a plurality of wanted desired focus values.

An arrow-shaped read-off mark 32 provided at the base part 12 allows the reading off of a specific distance value which is transmitted as a desired focus value or focus setting value from the control device to the focus setting apparatus of the motion picture camera.

Furthermore, a plurality of light-emitting diodes (LEDs) 22 are provided at the base part 12 as an incident light lighting device for illuminating the electronic display device 16. The region illuminated by the light-emitting diodes 22 also includes the read-off mark 32 so that a reliable operation of the remote control unit 10 is also ensured in the dark.

A setting or defining of the focus value marks 26, 26', 28, 28' can take place by actuating the button 20. Alternatively, this can also take place by a pressing down of the control element 18 axially to the axis of rotation D, with in this case an additional position encoder 52' (FIG. 4) or a push-button being arranged in the interior of the remote control unit 10.

As a comparison of FIGS. 1 and 2 show, it is possible to show different ranges of distance values 30, 30' on the focus scales 24, 24'.

In the focus control mode shown in FIG. 1, the focus scale 34 includes the total distance value range which can be set at the camera objective. However, due to the perspective, only a part section of the focus scale 24 is visible in FIG. 1 which covers distance values 30 between approximately 1 m and approximately 7 m. The focus value marks 26, 28 are set at approximately 3 m or 5 m.

In the focus control mode in accordance with FIG. 2, only a part range of the total distance value range is shown on the focus scale 24'. In the part section of the spread apart focus scale 24' visible due to the perspective in FIG. 2, the distance values 30' lie between approximately 3.25 m and approximately 4.75 m. The focus value marks 26', 28' are set at approximately 3 m or 4.25 m.

A comparison of FIGS. 1 and 2 shows that in the focus control mode in accordance with FIG. 2, a more sensitive setting of the desired focus value is possible, but the whole possible distance value range cannot be traveled to. This can, however, be compensated in that multiple revolutions (that is more than 360°) of the control element 18 are permitted and a respective other part range of the total distance value range is shown as the focus scale 24'. In contrast to this, in the operating mode in accordance with FIG. 1 the total distance value range is available, with the precision, however, being smaller over the operating mode of FIG. 2.

In accordance with a modification of the remote control unit 10 in accordance with the invention, provision can be made that the measure of the change of the angular position of the shown focus scale 24, 24' corresponds to the detected change in angular position of the control element 18 multiplied by a scaling factor. The scaling factor can be set by the user. The effects of different scaling factors will be explained by way of example in the following.

At a scaling factor of 1, the focus scale 24, 24' is displaced with respect to the read-off mark 32 synchronously with a rotation of the control element 18.

At a scaling factor of 0.5, a change in angular position of the control element 18 by 20° results in a change of the angular position of the focus scale 24, 24' of 10°.

Accordingly, at a scaling factor of 2, a change in angular position of the control element 18 of 20° results in a change of the angular position of the focus scale 24, 24' of 40°.

A scaling factor of less than 1 thus effects a stepping down which allows a sensitive setting of the desired focus value, whereas a scaling factor larger than 1 effects a stepping up which allows a high change rate of the desired focus value.

FIG. 3 shows the remote control unit 10 in the configuration mode. An exemplary configuration menu 34 is shown on the display device 16 instead of the focus scales 24, 24'. In this configuration menu 34, three different operating parameters 36 are displayed, which include the focus values associated with the focus value marks 26, 28 (FIG. 1) as well as the above-named scaling factor, as is a menu command 38.

If one of the operating parameters 36 is to be processed or deleted, it can be selected by rotating the control element 18 and the respective processing function can be carried out or a corresponding submenu of the configuration menu 34 can be selected by actuating the button 20 or by pressing down the control element 18. A navigation through corresponding menu levels is possible by selecting and activating a corresponding menu command 38.

FIG. 4 shows a block diagram with the substantial components of a control unit 10 shown in FIGS. 1 to 3. The control unit 10 has a battery 42 serving as an energy store for supplying the control unit 10 with electrical power. A control device 50 is connected to a position encoder 52 for detecting the rotational position of a control element 18 relative to a base part 12. The control device 50 can be connected to a further position encoder 52' for detecting the axial position of the control element 18. A lighting device 22 serves for lighting an electronic display device 16. This can, as shown, be arranged at the base part 12 and can be controlled by the control device 50 in accordance with the rotational position of the control element 18. Differing from the schematic representation in FIG. 4, the display device 26 has the shape of a cylinder or of a cylinder sector, such as explained in connection with FIGS. 1 to 3.

Selection commands can be transmitted to the control device 50 by means of a button 20 provided at the control element 18 or by pressing down the control element 18. A selectively deactivatable detent 56 is provided between the base part 12 and the rotatable control element 18. The control device 50 generates a control signal in accordance with the rotational position of the control element 18 (e.g. a focus control signal) which is transmitted to a focus setting apparatus of an associated motion picture camera.

REFERENCE NUMERAL LIST 10 remote control unit
12 base part
14 grip part
16 display device
18 control element
20 button (input device)
22 light-emitting diode (lighting device)
24, 24' focus scale
26, 26' focus value mark
28, 28' focus value mark
30, 30' distance value
32 read-off value
34 configuration menu
36 operating parameter
38 menu command
40 battery compartment
42 battery
50 control device
52, 52' position encoder
56 detent
D axis of rotation

The invention claimed is:
1. A control unit for generating a control signal comprising:
a base part (12);
a control element (18) rotatable about an axis of rotation relative to the base part (12);

a position encoder (52) for detecting an angular position or a change in angular position of the control element (18) relative to the base part (12);

a control device (50) which is adapted to generate the control signal in dependence on the detected angular position or change in angular position of the control element (18); and an electronic display device (16), wherein the control device (50) is adapted to control the electronic display device (16) for showing at least one symbol arrangement, wherein the electronic display device (16) has the shape of a cylinder or of a cylinder sector whose axis coincides with the axis of rotation of the control element (18) or runs in parallel hereto, wherein said electronic display device is rotatable relative to at least one of said base part and said control element.

2. A control unit in accordance with claim 1,
wherein the electronic display device (16) is non-lit.

3. A control unit in accordance with claim 1,
wherein the electronic display device (16) includes an electronic paper.

4. A control unit in accordance with claim 1,
wherein the control unit (10) is configured as a remote control unit (10) for a wired or wireless transmission of the control signal to a reception unit.

5. A control unit in accordance with claim 1,
wherein a read-off mark (32) associated with the electronic display device (16) is provided at the base part (12), with the relative position of the symbol arrangement shown at the electronic display device (16) defining a setting value with respect to the read-off mark (32) and with the named control signal including the setting value.

6. A control unit in accordance with claim 5,
wherein the control unit (10) has an input device (20) for inputting a selection command to the control device (50), with the control device (50) being adapted to show in the symbol arrangement an additional symbol at the presently detected angular position of the symbol arrangement with respect to the read-off mark (32) when the input device (20) is actuated.

7. A control unit in accordance with claim 1,
wherein the control signal includes at least one focus control signal for controlling a focus setting apparatus of a motion picture camera, wherein the control device (50) is adapted to transmit the focus control signal to the focus setting apparatus; and
wherein the symbol arrangement includes a focus scale (24, 24').

8. A control unit in accordance with claim 7,
wherein the focus scale (24, 24') includes a plurality of distance values (30, 30') and at least one focus value mark (26, 26'; 28, 28') definable by a user.

9. A control unit in accordance with claim 7,
wherein the focus scale (24, 24') shown at the electronic display device (16) has a range of a plurality of distance values (30, 30') which can be set by a user.

10. A control unit in accordance with claim 7,
wherein the control device (50) can selectively be switched into a focus control mode or into a configuration mode;
wherein the control device (50) is adapted to control the electronic display device (16) in the focus control mode to show the focus scale (24, 24'), to detect the angular position or the change in angular position of the control element (18) and to transmit the focus control signal to the focus setting apparatus; and
wherein the control device (50) is adapted to control the electronic display device (16) in the configuration mode to show a configuration menu (34) which allows the setting of operating parameters (36) of the control unit (10).

11. A control unit in accordance with claim 7,
wherein the control unit (10) has an input device (20) for inputting a selection command to the control device (50), with the control device (50) being adapted to set a focus value mark (26, 26'; 28, 28') showable on the focus scale (24, 24') in dependence on the input selection command.

12. A control unit in accordance with claim 1,
wherein the electronic display device (16) is rotationally fixedly coupled to the rotatable control element (18).

13. A control unit in accordance with claim 1,
wherein the electronic display device (16) is rotationally fixedly coupled to the base part (12), with the control device (50) being adapted to vary an angular position of the shown symbol arrangement relative to the electronic display device (16) in dependence on the detected angular position or change in angular position of the control element (18).

14. A control unit in accordance with claim 1,
wherein the control device (50) is adapted to set the measure of the change of the angular position of the shown symbol arrangement in dependence on a product of the detected change in angular position of the control element (18) and on a scaling factor, with the scaling factor preferably being freely selectable by a user.

15. A control unit in accordance with claim 1,
wherein the control device (50) is adapted to store and access user-defined settings of the symbol arrangement.

16. A control unit in accordance with claim 1,
wherein the base part (2) includes a grip part (14) which has a receiver (40) for at least one energy store (42) for supplying the control unit (10) with electrical power.

17. A control unit in accordance with claim 1,
wherein the base part (2) has a lighting device (22) for illuminating at least a part region of the electronic display device (16) with incident light.

18. A control unit in accordance with claim 1,
wherein a selectively deactivatable detent (56) is provided between the base part (12) and the rotatable control element (18).

19. A control unit in accordance with claim 1,
wherein the control element (18) can additionally be adjusted between at least two axial positions, with the control unit (10) having a further position encoder (52') for detecting the axial position of the control element (18).

* * * * *